3,340,040
METHOD OF TOBACCO SUCKER CONTROL

Tien C. Tso, Beltsville, Md., assignor to the United States of America as represented by the Secretary of Agriculture
No Drawing. Original application Jan. 10, 1964, Ser. No. 337,100. Divided and this application May 9, 1966, Ser. No. 565,343
14 Claims. (Cl. 71—78)

This application is a division of Ser. No. 337,100, filed Jan. 10, 1964.

A non-exclusive, irrevocable, royalty-free license in the invention herein described, throughout the world for all purposes of the United States Government, with the power to grant sublicenses for such purposes, is hereby granted to the Government of the United States of America.

This invention relates to a method for controlling the growth of suckers in tobacco plants. More particularly, it relates to the use of certain fatty acid derivatives to control sucker growth in tobacco plants.

An established process for tobacco farmers is to remove the stem apex, including flowers and some top leaves, near the stage of plant maturity to stimulate the development of the remaining leaves and to obtain desirable physical and chemical properties for the best utility. This process is commonly known as "topping." After such an operation, axillary buds, or suckers, start to develop, and these suckers have to be continuously removed to achieve the purpose of topping. Usually the removal of suckers is carried out by hand, which is a laborious and time-consuming process. Certain chemical growth-control agents have been suggested; but while some of these provide adequate inhibition of sucker development and are in commercial use, other metabolic changes are induced which are considered undesirable in tobacco quality. In addition, there has been some question of undesirable residues of these agents in the leaf tissue.

It is an object of this invention to provide a method and compositions which can successfully control sucker growth without any adverse effects on the tobacco leaves and on the resultant products made therefrom. Another object is to provide compositions effective to control sucker growth which will not introduce any undesirable foreign residues into the tobacco leaf tissues. Other objects and benefits will be apparent to those skilled in the art from the description of the invention which follows:

In general, in accordance with this invention, it has been found that certain fatty acid esters, when applied to the upper portions of decapitated, or topped, tobacco plants, or to plants on which the flower buds have newly formed, will accomplish the foregoing objectives. More particularly, the present invention involves the discovery that, when the lower alkyl esters, especially the methyl esters of both saturated and unsaturated fatty acids, superior sucker control is achieved without at the same time introducing undesirable residues, inducing undesirable metabolic changes, or otherwise producing results which are considered in the industry to lower the quality of the tobacco. It was further discovered that certain synthetic growth regulators, notably, isopropyl-N-(3-chlorophenyl) carbamate, which ordinarily cause leaf deformation when applied in amounts effective to control suckers, can now be used in amounts as low as one-tenth of those formerly required, when mixed with the fatty acid alkyl esters. Effective control is thus achieved without leaf deformation. In addition mixtures of esters can be used.

Thus, the present invention comprises a method of controlling the growth of suckers in tobacco plants by applying to the tops of decapitated plants, or to plants having newly formed flower buds, a lower alkyl ester of a fatty acid, mixtures of such esters, or a mixture of such an ester with a synthetic growth control substance.

It has been found that the lower alkyl (particularly the methyl) esters of $C_6$ to $C_{18}$ saturated and unsaturated fatty acids are useful for the purposes of this invention, the methyl esters of the $C_8$ to $C_{12}$ fatty acids being particularly effective in concentrations as low as 5%.

In practicing the invention it is merely necessary to prepare an aqueous emulsion of the desired ester and spray it on the decapitated plant or onto the newly formed flower buds. Any suitable emulsifying agent can be used in preparing the composition.

Without being bound by the explanation of the mechanism of the action of the esters, it appears that the meristematic and differentiating cells of axillary buds are destroyed when contacted by the fatty acid esters, but cells in advanced stage of maturity are not affected. Thus, the esters do not impair the mature tobacco leaves while they destroy the axillary buds. In addition, because the axillary buds are destroyed on contact, the esters themselves do not take part in the metabolism of the plant and do not enter the tissues of the plant so that the treatment does not cause any changes other than those normally occurring during hand suckering.

Furthermore, many fatty acids, including myristic, pentadecanoic, pentadecenoic, palmitic, palmitoleic, stearic, oleic, linoleic, and linolenic, are naturally present in tobacco leaves, while palmitic, stearic, oleic, and linoleic acids are among the acids naturally present in tobacco seeds. Thus, the application of fatty acid esters according to this invention will not introduce compounds foreign to the composition of the tobacco.

In order that the invention may be better understood, reference is made to the following examples. It will be recognized, however, that these examples are illustrative only and that those skilled in the art will be able to prepare other compositions on the basis of the disclosure without departing from the spirit of the invention.

Example 1

Methyl caprate (95% active) 2 ml. was mixed with .8 ml. of Tween-20 and 40 ml. of water, emulsified and the entire composition sprayed onto the top of the decapitated plant. The area covered by spraying was about 8 inches in diameter. This solution will normally drain down along the stem of the plant and destroy the meristematic and differentiating tissues through contact. This process was repeated after one week. This application gave 96% sucker inhibition in four types of tobacco grown in Beltsville, Md., in 1963.

Example 2

A mixture of methyl laurate with methyl myristate was prepared in five fomulations containing 50%, 70%, 80%, 90%, and 96% laurate and 48%, 28%, 18%, 8%, and 2% myristate, respectively. 2 ml. of the mixtures of methyl esters plus .8 ml. of Tween-20, and 40 ml. of water, were emulsified and sprayed onto the topped tobacco plant. This gave sucker inhibition of 100%, 100%, 99%, 100%, and 99%, respectively.

Example 3

Use 2 ml. of methyl ester mixture of 55% caprylate and 40% caprate and .8 ml. of Tween-20 and 40 ml. of water, emulsified and sprayed onto the topped tobacco plants, gave 100% sucker inhibition.

Example 4

An emulsion of 2 ml. of methyl ester of pelargonic acid plus .8 ml. of Tween-20 and 40 ml. of water sprayed onto the top of the topped tobacco plant gave 98% sucker inhibition.

Example 5

2 ml. of a mixture of 48% methyl laurate, 17% myristate, 8% caprylate, 7% caprate, 9% palmitate, and 7% oleate, emulsified with .8 ml. of Tween-20 and 40 ml. of water, and sprayed onto the topped tobacco plant gave 100% sucker inhibition.

The following examples illustrate the synergistic effect produced when the fatty acid esters are mixed with synthetic growth inhibitors which, if used alone in effective concentrations, cause leaf deformities and changes in tobacco quality.

The mixture, after being emulsified was sprayed onto topped tobacco plants, and was effective in preventing the growth of suckers.

In Table 1, below, are listed the data on sixteen experiments using the methyl esters of various commercially obtained fatty acids. The percentages set forth in each horizontal line represent the amounts of the component acids in each commercial acid. Thus, for example, in Treatment No. 1, the caprylic acid used consisted of 90% caprylic acid itself, 7% caproic acid ($C_6$), and 3% capric acid ($C_{10}$). Columns 11–13 set forth the four types of tobacco plant which were treated, while the last column states the average inhibition obtained with each variety.

TABLE 1.—PERCENT OF SUCKER INHIBITION OF FOUR TYPES OF TOBACCO

[Average of two crops, 50 plants each crop]

| Treatment No. | Percent of various fatty acid methyl esters in mixture [1] | | | | | | | | | Percent Sucker Inhibition (3 wks. after topping) | | | | |
|---|---|---|---|---|---|---|---|---|---|---|---|---|---|---|
| | Caproate $C_6$ | Caprylate $C_8$ | Caprate $C_{10}$ | Laurate $C_{12}$ | Myristate $C_{14}$ | Palmitate $C_{16}$ | Stearate $C_{18}$ | Oleate $C_{18}$ (−2H) | Linoleate $C_{18}$ (−4H) | Maryland Catterton | Hicks | Burley 21 | Conn. Broadleaf | Average |
| 1 | 7 | 90 | 3 | | | | | | | 79 | 92 | 73 | 88 | 83 |
| 2 | 3 | 55 | 40 | 2 | | | | | | 97 | 96 | 92 | 98 | 96 |
| 3 [2] | | 3 | 95 | 2 | | | | | | 100 | 99 | 100 | 96 | 99 |
| 4 | | | 2 | 96 | 2 | | | | | 94 | 83 | 85 | 94 | 89 |
| 5 | | | 2 | 90 | 8 | | | | | 92 | 98 | 82 | 94 | 92 |
| 6 | | | 2 | 80 | 18 | | | | | 89 | 90 | 72 | 78 | 82 |
| 7 | | | 1 | 70 | 28 | 1 | | | | 90 | 90 | 68 | 79 | 82 |
| 8 | | | | 50 | 48 | 1 | | | | 95 | 89 | 86 | 88 | 89 |
| 9 | | | | 3 | 95 | 2 | | | | 96 | 86 | 87 | 52 | 80 |
| 10 | | 1 | 39 | 4 | 55 | 1 | | | | 96 | 94 | 95 | 70 | 88 |
| 11 | | | | | 2 | 40 | 20 | 31 | 7 | 84 | 66 | 59 | 23 | 58 |
| 12 | | | | | 2 | 40 | 56 | 2 | | 90 | 90 | 100 | 59 | 85 |
| 13 | | | | | 5 | 90 | 4 | 1 | | 69 | 39 | 70 | 58 | 59 |
| 14 | | | | | | 4 | 95 | 1 | | 40 | 90 | 55 | 3 | 47 |
| 15 | | (Glycerides 25%) | | | 5 | 30 | 12 | 23 | 5 | 77 | 55 | 65 | 59 | 64 |
| 16 | | 8 | 7 | 48 | 17 | 9 | 2 | 7 | 2 | 68 | 78 | 54 | 63 | 66 |

[1] 2 ml. of ester mixture emulsified in 40 ml. of water applied per plant.
[2] Applied twice with one week intervals.

Example 6

Emulsions were prepared as described above, using 1 and 2 ml. portions of methyl caprate (95%) and 20 and 40 mg. of CIPC, isopropyl-N-(3-chlorophenyl) carbamate. When sprayed on decapitated tobacco plants, 96 to 100% sucker inhibition was achieved. The amounts of CIPC were one-tenth and one-fifth, respectively, the amounts of that agent normally required to obtain effective inhibition.

Table 2 below sets forth data on four treatments involving mixtures of methyl caprylate and CIPC, as well as one using free 10-undecenoic acid and one using methyl pelargonate.

TABLE 2.—TESTS WITH MATERIALS DERIVED FROM OR MIXED WITH FATTY ACIDS

| Treatment No. | Composition | Percent Sucker Inhibition (3 wks. after topping) | | | | |
|---|---|---|---|---|---|---|
| | | Maryland Catterton | Hicks | Burley 21 | Connecticut Broadleaf | Average |
| 17 | Methyl caprylate 1 ml.[1] plus 20 mg. CIPC [2] | 98 | | | | 98 |
| 18 | Methyl caprylate 1 ml.[1] plus 40 mg. CIPC [2] | 100 | 91 | 100 | 96 | 96 |
| 19 | Methyl caprylate 2 ml.[3] plus 20 mg. CIPC [2] | 100 | | | | 100 |
| 20 | Methyl caprylate 2 ml.[3] plus 40 mg. CIPC [2] | 100 | | 100 | 94 | 98 |
| 21 | 10-undecenoic acid [4] $C_{11}H_{20}O_2$ | 100 | 99 | 100 | 100 | 100 |
| 22 | Methyl pelargonate [4] $CH_3(CH_2)_7COOCH_3$ | 98 | 100 | 93 | 98 | 97 |

[1] 1 ml. of ester emulsified in 40 ml. of water.
[2] CIPC = Isopropyl -N-(3-chlorophenyl) carbamate.
[3] 2 ml. of ester emulsified in 40 ml. of water.
[4] 2 ml. emulsified in 40 ml. of water.

Example 7

From 50 to 100 parts per million of CIPC were added to 40 ml. portions of a 5% methyl caprate emulsion prepared as previously described. These were sprayed onto tobacco plants having newly formed flower buds. Both the flower buds and axillary buds were destroyed. By this procedure it was possible to prevent blossoming and to eliminate the suckering process.

Example 8

A mixture was prepared of 1 ml. of undecenoic acid ($C_{11}H_{20}O_2$), 0.8 ml. of Tween-20, and 40 ml. of water.

Table 3 sets forth data on experiments carried out on field-grown Maryland tobacco for the purpose of comparing the results obtained according to the present invention with those using maleic hydrazide, an inhibitor currently in widespread use for inhibiting growth of suckers.

In addition to the percent of sucker inhibition, field appearance was rated based on general plant appearance, leaf appearance, leaf damage, or other abnormalities. Field appearance is rated from 1 to 5, 5 being the highest rating. The product of percent of sucker inhibition and field appearance is called "Desirability index." Results from Table 3 show that maleic hydrazide is ranked 5 in a test of 8 materials.

TABLE 3.—DESIRABILITY EVALUATION OF SOME FATTY ACID TREATMENTS IN COMPARISON WITH MALEIC HYDRAZIDE (FIELD-GROWN MARYLAND TOBACCO)

| Treatment [1] | Percent of sucker inhibition (A) | Field appearance rating (B) | Desirability index [2] (A x B) | Rank |
|---|---|---|---|---|
| Control (topped, not suckered) | 0 | 5— | 0 | |
| Maleic hydrazide [3] (170 mg./plant) | 99 | 5— | 495 | 5 |
| #2 | 100 | 5 | 498 | 4 |
| #4 | 99 | 4.9 | 481 | 7 |
| #5 | 100 | 4.9 | 488 | 6 |
| #6 | 99 | 4.9 | 480 | 8 |
| #7 | 100 | 5 | 500 | 1 |
| #8 | 100 | 5— | 498 | 3 |
| #16 | 100 | 5— | 499 | 2 |

[1] The composition of each treatment number is described in Table 1.
[2] Average of four replications.
[3] Commercially used growth control agent (for purposes of comparison).

I claim:

1. A method of inhibiting the growth of suckers in tobacco plants which comprises applying to topped tobacco plants an amount of a lower alkyl ester of a $C_6$ to $C_{18}$ fatty acid effective to achieve at least about 47% inhibition of sucker growth.

2. A method of inhibiting the growth of suckers in tobacco plants which comprises applying to topped tobacco plants an amount of an aqueous emulsion of a member of the group consisting of a lower alkyl ester of a $C_6$ to $C_{18}$ fatty acid and mixtures of such esters effective to achieve at least about 47% inhibition of sucker growth.

3. The method of claim 2 wherein the lower alkyl ester is the methyl ester.

4. The method of claim 2 wherein the ester is methyl caproate.

5. The method of claim 2 wherein the ester is methyl caprylate.

6. The method of claim 2 wherein the ester is methyl caprate.

7. The method of claim 2 wherein the ester is methyl laurate.

8. The method of claim 2 wherein the ester is methyl myristate.

9. The method of claim 2 wherein the ester is methyl palmitate.

10. The method of claim 2 wherein the ester is methyl stearate.

11. The method of claim 2 wherein the ester is methyl oleate.

12. The method of claim 2 wherein the ester is methyl linoleate.

13. The method of claim 2 wherein the ester is methyl pelargonate.

14. A method of inhibiting the growth of suckers in tobacco plants which comprises applying to topped tobacco plants an amount of an aqueous emulsion of 10-undecenoic acid effective to achieve inhibition of sucker growth.

References Cited

UNITED STATES PATENTS 2,772,152  11/1956  Emond et al. _____ 71—2.7 X
3,223,517  12/1965  Abramitis et al. _____ 71—2.7

OTHER REFERENCES

Tso et al.: Chemical Abstracts, vol. 59, column 8064 (e), 1963.

LEWIS GOTTS, *Primary Examiner.*

JAMES O. THOMAS, Jr., *Examiner.*